United States Patent
Hagiwara (10) Patent No.: US 11,175,737 B2
(45) Date of Patent: Nov. 16, 2021

(54) ELECTRONIC DEVICE FOR RECEIVING LINE OF SIGHT INPUT, METHOD OF CONTROLLING ELECTRONIC DEVICE, AND NON-TRANSITORY COMPUTER READABLE MEDIUM

(71) Applicant: CANON KABUSHIKI KAISHA, Tokyo (JP)

(72) Inventor: Shinichi Hagiwara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/942,046

(22) Filed: Jul. 29, 2020

(65) Prior Publication Data

US 2021/0034150 A1 Feb. 4, 2021

(30) Foreign Application Priority Data

Jul. 30, 2019 (JP) .............................. JP2019-140035

(51) Int. Cl.
*G06F 3/01* (2006.01)
*G06K 9/00* (2006.01)
*H04N 5/232* (2006.01)

(52) U.S. Cl.
CPC ......... *G06F 3/013* (2013.01); *G06K 9/00228* (2013.01); *H04N 5/232933* (2018.08)

(58) Field of Classification Search
None
See application file for complete search history.

(56) References Cited

U.S. PATENT DOCUMENTS

| 8,521,015 | B2 * | 8/2013 | Ogino | G02B 7/282 396/104 |
| 10,165,175 | B2 * | 12/2018 | Kondo | G06F 3/0482 |
| 10,277,795 | B2 * | 4/2019 | Mikawa | H04N 5/232933 |
| 10,841,501 | B2 * | 11/2020 | Shimizu | G06K 9/00335 |
| 2015/0277552 | A1 * | 10/2015 | Wilairat | G06F 3/013 386/244 |
| 2016/0091967 | A1 * | 3/2016 | Prokofieva | G10L 17/22 345/156 |
| 2017/0099431 | A1 * | 4/2017 | Harada | G11B 27/34 |
| 2017/0293356 | A1 * | 10/2017 | Khaderi | A61B 3/024 |
| 2017/0344108 | A1 * | 11/2017 | Mosqueda Mejia | G06F 3/013 |
| 2017/0358141 | A1 * | 12/2017 | Stafford | A63F 13/537 |

(Continued)

FOREIGN PATENT DOCUMENTS

JP 2009-251658 A 10/2009

*Primary Examiner* — Vinh T Lam
(74) *Attorney, Agent, or Firm* — Cowan, Liebowitz & Latman, P.C.

(57) ABSTRACT

An electronic device comprising: a control unit performs control such that a selected position in a display is changed, wherein the control unit performs control such that the selected position is changed based on gazing at a first position in response to satisfaction of a viewed point condition corresponding to a fact that gazing at the first position at a first distance from the selected position has been performed for a first period, and the selected position is changed based on gazing at a second position in response to satisfaction of a viewed point condition corresponding to a fact that gazing at the second position at a second distance which is farther from the selected position than the first distance, has been performed for a second period shorter than the first period.

19 Claims, 5 Drawing Sheets

(56) References Cited

U.S. PATENT DOCUMENTS

| | | | |
|---|---|---|---|
| 2018/0173305 A1* | 6/2018 | Okabe | G06F 3/0481 |
| 2019/0155495 A1* | 5/2019 | Klein | G06F 3/011 |
| 2019/0258857 A1* | 8/2019 | Alonso | G06F 3/0304 |
| 2019/0320120 A1* | 10/2019 | Du | H04N 5/2258 |
| 2019/0324529 A1* | 10/2019 | Stellmach | G06F 3/013 |
| 2019/0324530 A1* | 10/2019 | Stellmach | G02B 27/0172 |
| 2019/0354171 A1* | 11/2019 | Dai | G06K 9/00597 |
| 2019/0361521 A1* | 11/2019 | Stellmach | G06F 3/017 |
| 2019/0369719 A1* | 12/2019 | Klingstrom | G02B 27/0179 |
| 2020/0015727 A1* | 1/2020 | Maskery | A61B 3/113 |
| 2020/0319705 A1* | 10/2020 | Rohrbacher | G06F 3/017 |
| 2021/0197724 A1* | 7/2021 | Gu | G06K 9/4661 |

* cited by examiner

ELECTRONIC DEVICE FOR RECEIVING LINE OF SIGHT INPUT, METHOD OF CONTROLLING ELECTRONIC DEVICE, AND NON-TRANSITORY COMPUTER READABLE MEDIUM

BACKGROUND OF THE INVENTION

Field of the Invention

The present invention relates to an electronic device for receiving a line of sight input, a method of controlling the electronic device, and a non-transitory computer readable medium.

Description of the Related Art

Conventionally, an electronic device such as a camera in which a direction of a user's line of sight (eye direction) is detected to detect a region (a position) that the user is observing in a visual field of a finder, whereby various photographing functions such as automatic focusing and automatic exposure are controlled, has been proposed.

Japanese Patent Application Publication No. 2009-251658 discloses a technique of a display device in which, in a case where a period in which a user's line of sight is fixed on a certain region exceeds a predetermined threshold, it is determined that the user is gazing at the region and a function according to an item of a menu corresponding to the position at which the user is gazing is performed.

Since humans observe various things, positions at which a line of sight is detected frequently move. In addition, it is known as a human characteristic that a point that a person views moves slightly even if he or she intends to continuously look at the same place (involuntary eye movement). Therefore, even if a user selects one of displayed objects with the user's line of sight and does not intend to move the line of sight, a detected position of the line of sight changes slightly.

Therefore, if one of the displayed objects is selected in accordance with the line of sight and then the selected object is simply changed based on a position at which the line of sight is last detected, the selection may change against the user's intention. On the other hand, if responsiveness of the selection change is lowered, the user feels that an operational feeling is poor.

SUMMARY OF THE INVENTION

Therefore, an object of the present invention is to provide an electronic device in which changing of a selection target which is not intended by a user due to a line of sight and deterioration of an operational feeling can be reduced.

An aspect of the present invention is:
an electronic device comprising:
at least one memory and at least one processor which function as:
a receiving unit configured to receive a line of sight input by a line of sight of a user looking at a display; and
a control unit configured to perform control such that a selected position in the display is changed in accordance with an input position resulting from the line of sight input, wherein
the control unit performs control
A) such that the selected position is changed based on gazing at a first position in response to satisfaction of a viewed point condition corresponding to a fact that gazing at the first position at a first distance from the selected position has been performed for a first period, and
B) such that the selected position is changed based on gazing at a second position in response to satisfaction of a viewed point condition corresponding to a fact that gazing at the second position at a second distance which is farther from the selected position than the first distance, has been performed for a second period shorter than the first period.

Further features of the present invention will become apparent from the following description of exemplary embodiments with reference to the attached drawings.

DESCRIPTION OF THE EMBODIMENTS

Embodiment

<External View of Digital Camera 100>

Figure 1A:
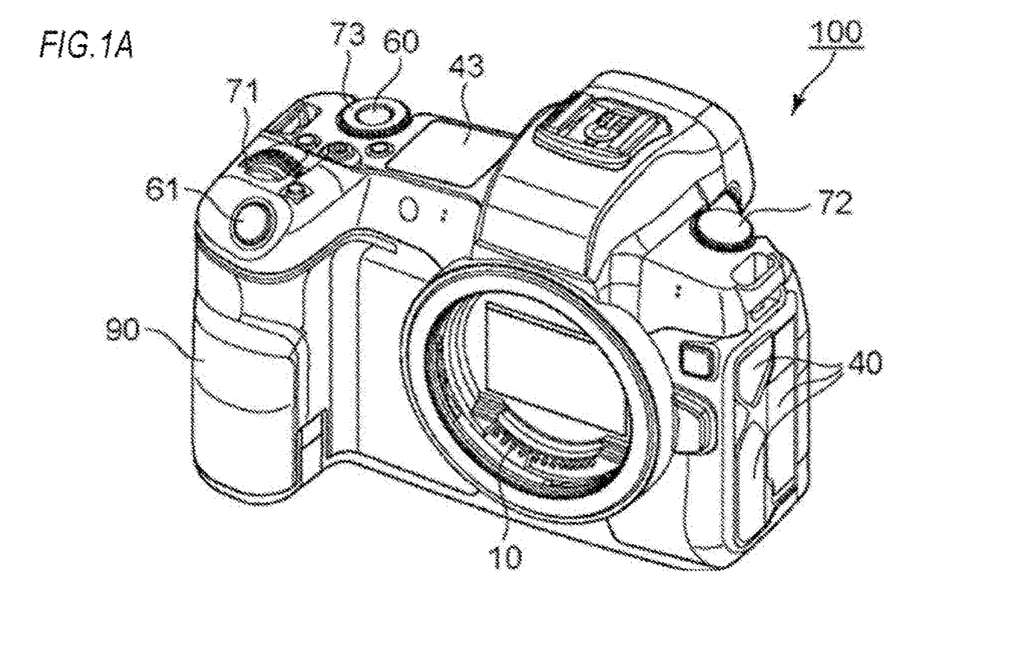
FIGS. 1A and 1B are external views of a digital camera according to the present embodiment.
Figure 1B:
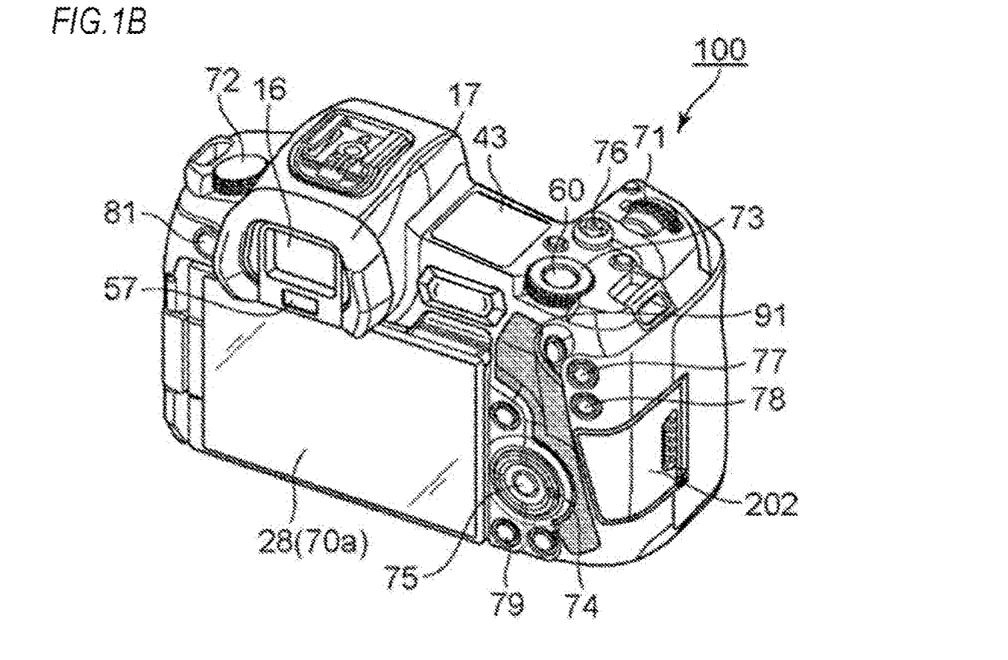

Hereinafter, preferred embodiments of the present invention will be described with reference to the figures. FIGS. 1A and 1B are external views of a digital camera 100 as an example of a device to which the present invention can be applied. FIG. 1A is a front perspective view of the digital camera 100, and FIG. 1B is a rear perspective view of the digital camera 100.

A display unit 28 is a display unit provided on a back surface of the digital camera 100 and displays images and various information. A touch panel 70a can detect a touch operation on a display surface (a touch operation surface) of the display unit 28. A finder outside display unit 43 is a display unit provided on an upper surface of the digital camera 100 and displays various setting values of the digital camera 100 such as a shutter speed and an aperture. A shutter button 61 is an operation member for giving an imaging instruction. A mode switch 60 is an operation member for switching between various modes. A terminal cover 40 is a cover that protects a connector (not shown) for connecting the digital camera 100 to an external device.

A main electronic dial 71 is a rotary operation member, and by turning the main electronic dial 71, the setting values such as the shutter speed and the aperture can be changed. A power switch 72 is an operation member for switching between power ON and OFF of the digital camera 100. A sub electronic dial 73 is a rotary operation member, and by turning the sub electronic dial 73, movement of a selection frame (a cursor), transmission of images, and the like can be performed. A four-way key 74 is configured such that upper, lower, left, and right portions thereof can be pressed, and can perform processing corresponding to a pressed portion of the four-way key 74. A SET button 75 is a push button and is mainly used to determine a selected item.

A video button 76 is used to start or stop video shooting (recording). An AE lock button 77 is a push button and an exposure state can be fixed by pressing the AE lock button 77 in an imaging standby state. An enlargement button 78 is an operation button for switching between ON and OFF of an enlargement mode in a live view display (LV display) of an imaging mode. By operating the main electronic dial 71 after turning on the enlargement mode, the live view image (LV image) can be enlarged or reduced. In a reproduction mode, the enlargement button 78 functions as an operation button for enlarging a reproduction image and increasing an enlargement ratio thereof. A reproduction button 79 is an operation button for switching between the imaging mode and the reproduction mode. By pressing the reproduction button 79 during the imaging mode, the mode is changed to the reproduction mode, and a latest image among images recorded on a recording medium 200 (which will be described later) can be displayed on the display unit 28. A menu button 81 is a push button used for performing an instruction operation for displaying a menu screen, and when the menu button 81 is pressed, the menu screen on which various settings can be made is displayed on the display unit 28. A user can intuitively perform various settings using the menu screen displayed on the display unit 28, the four-way key 74, and the SET button 75.

A communication terminal 10 is a communication terminal for the digital camera 100 to communicate with a lens unit 150 (detachable; which will be described later). An eyepiece unit 16 is an eyepiece unit of an eyepiece finder (a look-in type finder), and a user can visually recognize an image displayed on an internal EVF 29 (which will be described later) via the eyepiece unit 16. An eyepiece detection unit 57 is an eyepiece detection sensor that detects whether or not a user (a photographer) is looking in the eyepiece unit 16. A lid 202 is a lid of a slot for storing the recording medium 200 (which will be described later). A grip part 90 is a holding part that is shaped such that the user can easily hold it with a right hand when holding the digital camera 100. The shutter button 61 and the main electronic dial 71 are disposed at positions at which they can be operated with an index finger of the right hand while the digital camera 100 is held with the grip part 90 gripped by a little finger, a ring finger and a middle finger of the right hand. Further, in the same state, the sub electronic dial 73 is disposed at a position at which the sub electronic dial 73 can be operated with a thumb of the right hand. A thumb rest part 91 (a thumb standby position) is a grip member provided on the back surface side of the digital camera 100 at a location at which the thumb of the right hand holding the grip part 90 can be easily placed without operating any operation members. The thumb rest part 91 is formed of a rubber member or the like for increasing a holding force (a grip feeling).

<Configuration Block Diagram of Digital Camera 100>

Figure 2:
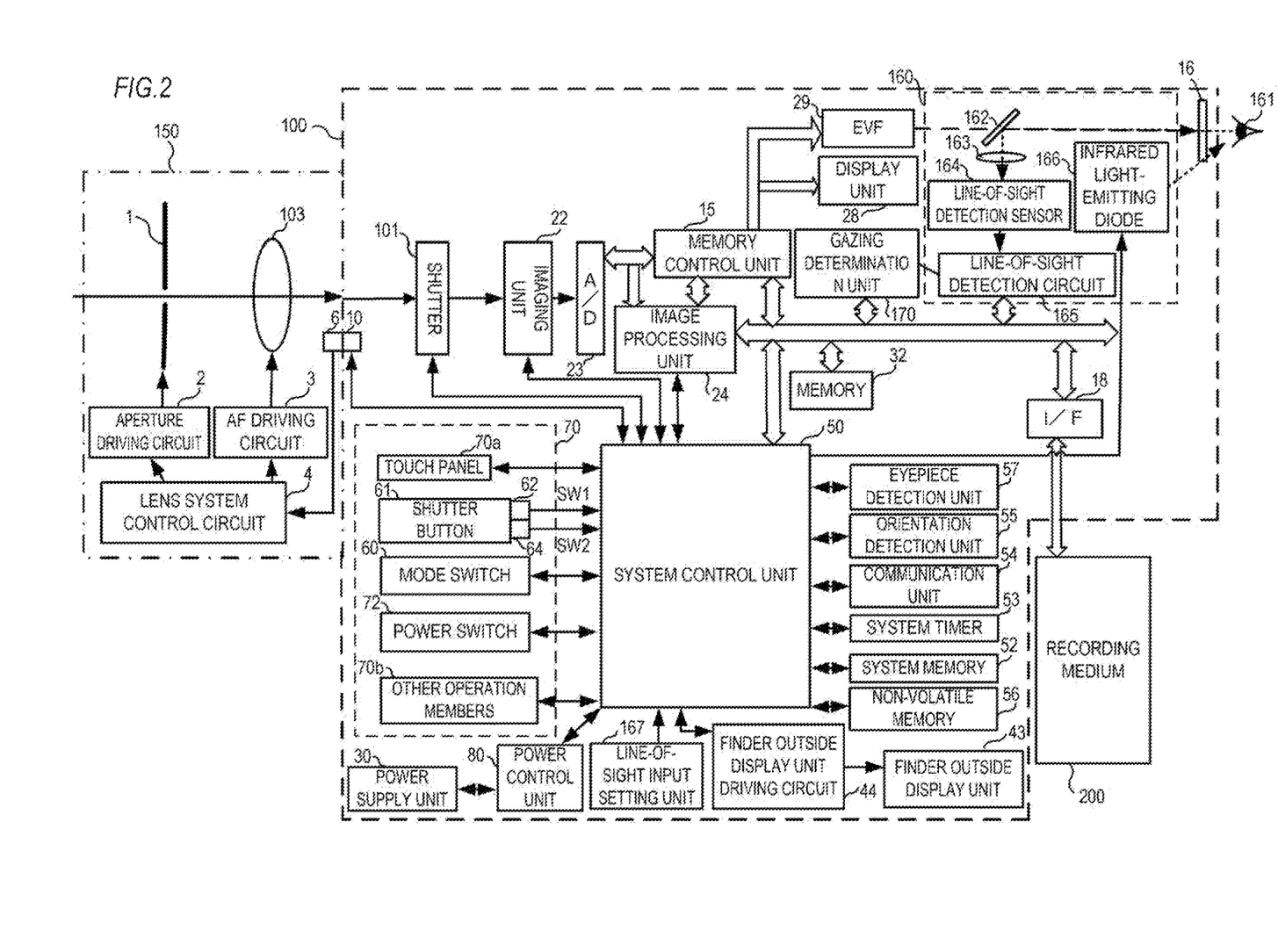
FIG. 2 is a block diagram of the digital camera according to the present embodiment.

FIG. 2 is a block diagram showing a configuration example of the digital camera 100. The lens unit 150 is a lens unit on which an interchangeable photographing lens is mounted. A lens 103 is normally configured of a plurality of lenses, but FIG. 2 simply shows only one lens. A communication terminal 6 is a communication terminal for the lens unit 150 to communicate with the digital camera 100 side, and the communication terminal 10 is a communication terminal for the digital camera 100 to communicate with the lens unit 150 side. The lens unit 150 communicates with a system control unit 50 via these communication terminals 6 and 10. In addition, the lens unit 150 performs control of an aperture 1 via an aperture driving circuit 2 using an internal lens system control circuit 4. Further, the lens unit 150 focuses by displacing the lens 103 via an AF driving circuit 3 using the lens system control circuit 4.

A shutter 101 is a focal plane shutter that can freely control an exposure time of an imaging unit 22 under control of the system control unit 50.

The imaging unit 22 is an imaging element configured of a CCD or a CMOS element that converts an optical image into an electrical signal. The imaging unit 22 may have an imaging plane phase difference sensor that outputs defocus amount information to the system control unit 50.

An image processing unit 24 performs predetermined processing (pixel interpolation, resize processing such as reduction, color conversion processing, and the like) on data from an A/D converter 23 or data from a memory control unit 15. Also, the image processing unit 24 performs a predetermined calculation process using captured image data, and the system control unit 50 performs exposure control and distance measurement control on the basis of the calculation results obtained by the image processing unit 24. Thus, through the lens (TTL) type autofocus (AF) processing, automatic exposure (AE) processing, flash pre-emission (EF) processing, and the like are performed. The image processing unit 24 further performs predetermined calculation processing using the captured image data and performs TTL type auto white balance (AWB) processing on the basis of obtained calculation results.

The memory control unit 15 controls data transmission and reception among the A/D converter 23, the image processing unit 24, and a memory 32. Output data from the A/D converter 23 is written to the memory 32 via the image processing unit 24 and the memory control unit 15. Alternatively, output data from the A/D converter 23 is written to the memory 32 via the memory control unit 15 without passing through the image processing unit 24. The memory 32 stores image data that is obtained by the imaging unit 22 and converted into digital data by the A/D converter 23 and image data to be displayed on the display unit 28 and the EVF 29. The memory 32 has a sufficient storage capacity for storing a predetermined number of still images and a predetermined amount of time of videos and audios.

Further, the memory 32 also serves as an image display memory (a video memory). The display image data written in the memory 32 is displayed on the display unit 28 or the EVF 29 via the memory control unit 15. Each of the display unit 28 and the EVF 29 performs display in accordance with a signal from the memory control unit 15 on a display such as an LCD or an organic EL. The live view display (LV) can be performed by sequentially transferring the data that is A/D-converted by the A/D converter 23 and stored in the memory 32 to the display unit 28 or the EVF 29 and displaying it. Hereinafter, an image displayed in the live view display is referred to as a live view image (LV image).

A line-of-sight detection unit 160 (eye tracker, eye tracking unit) detects a line of sight of the user in the eyepiece unit 16. The line-of-sight detection unit 160 includes a dichroic mirror 162, an imaging lens 163, a line-of-sight detection sensor 164, a line-of-sight detection circuit 165, and an infrared light-emitting diode 166. Also, since the system control unit 50 can execute a predetermined process in accordance with detection of the line of sight, the line-of-sight detection unit 160 can be said to be referred to as a part of an operation unit 70.

The infrared light-emitting diode 166 is a light emitting element for detecting a viewed position (position of the line of sight) of the user in a finder screen and irradiates an eyeball (eye) 161 of the user with infrared light. The infrared light emitted from the infrared light-emitting diode 166 is reflected by the eyeball (eye) 161, and the reflected infrared light reaches the dichroic mirror 162. The dichroic mirror 162 reflects only infrared light and transmits visible light. The reflected infrared light of which an optical path has been changed forms an image on an imaging plane of the line-of-sight detection sensor 164 via the imaging lens 163. The imaging lens 163 is an optical member that constitutes a line of sight detection optical system. The line-of-sight detection sensor 164 includes an imaging device such as a CCD image sensor.

The line-of-sight detection sensor 164 photoelectrically converts the reflected infrared light that is incident thereon into an electrical signal and outputs the electrical signal to the line-of-sight detection circuit 165. The line-of-sight detection circuit 165 detects a viewed position of the user from movement of the eyeball (eye) 161 of the user on the basis of the output signal of the line-of-sight detection sensor 164 and outputs detection information to the system control unit 50 and a gazing determination unit 170.

A line-of-sight input setting unit 167 sets whether the detection of the line of sight performed by the line-of-sight detection circuit 165 (line-of-sight detection unit 160) is valid or invalid. Alternatively, the line-of-sight input setting unit 167 sets whether processing of the system control unit 50 in accordance with an input of the line of sight is valid or invalid. For example, the user can arbitrarily set such a valid/invalid setting by operating the operation unit 70 in a menu setting.

The gazing determination unit 170 determines on the basis of the detection information received from the line-of-sight detection circuit 165 that, when a period in which the line of sight of the user is fixed to a certain area exceeds a predetermined threshold, the user is gazing at the area. Therefore, it can be said that the area is a gazing position (gazing area) at which the gazing is performed. In addition, "the line of sight is fixed to a certain area" indicates that, for example, an average position of movement of the line of sight is within the area until a predetermined period elapses, and that a variation (a dispersion) thereof is smaller than a predetermined value. Further, the predetermined threshold can be arbitrarily changed by the system control unit 50. Also, the gazing determination unit 170 may not be provided as an independent block, and the system control unit 50 may execute the same function as the gazing determination unit 170 on the basis of the detection information received from the line-of-sight detection circuit 165.

Various setting values of the camera such as the shutter speed and the aperture are displayed on the finder outside display unit 43 via a finder outside display unit driving circuit 44.

A non-volatile memory 56 is a memory that can be electrically erased and recorded on, and is, for example, a flash-ROM or the like. The non-volatile memory 56 stores constants, programs, and the like for an operation of the system control unit 50. The programs referred to here are programs for executing various flowcharts, which will be described later in the present embodiment.

The system control unit 50 is a control unit including at least one processor or circuit and controls the entire digital camera 100. The system control unit 50 realizes each process of the present embodiment, which will be described later, by executing programs recorded in the non-volatile memory 56 described above. A system memory 52 is, for example, a RAM, and the system control unit 50 develops, in the system memory 52, constants and variables for the operation of the system control unit 50, programs read from the non-volatile memory 56, and the like. Also, the system control unit 50 performs display control by controlling the memory 32, the display unit 28, and the like.

A system timer 53 is a time measuring unit that measures a time used for various controls and a time of an embedded clock.

A power control unit 80 is configured of a battery detection circuit, a DC-DC converter, a switch circuit for switching a block to be energized, and the like, and detects whether or not a battery is mounted, a type of the battery, detection of a remaining battery level, and the like. Further, the power control unit 80 controls the DC-DC converter on the basis of the detection results and an instruction of the system control unit 50 and supplies a necessary voltage to each unit including the recording medium 200 for a necessary period. A power supply unit 30 is configured of a primary battery such as an alkaline battery and a lithium battery, a secondary battery such as a NiCd battery, a NiMH battery, and a Li battery, an AC adapter, and the like.

A recording medium I/F 18 is an interface with the recording medium 200 such as a memory card or a hard disk. The recording medium 200 is a recording medium such as a memory card for recording captured images and includes a semiconductor memory, a magnetic disk, and the like.

A communication unit 54 transmits and receives a video signal and an audio signal to and from an external device connected in a wireless manner or by a wired cable. The communication unit 54 can also be connected to a wireless local area network (LAN) or the Internet. Further, the communication unit 54 can also communicate with the external device using Bluetooth (registered trademark) or Bluetooth (registered trademark) Low Energy. The communication unit 54 can transmit an image (including an LV image) captured by the imaging unit 22 and an image recorded in the recording medium 200 and can receive image data and other various information from the external device.

An orientation detection unit 55 detects an orientation of the digital camera 100 with respect to a direction of gravity. On the basis of the orientation detected by the orientation detection unit 55, whether an image captured by the imaging unit 22 is an image captured by holding the digital camera 100 horizontally or an image captured by holding the digital camera 100 vertically can be determined. The system control unit 50 can add orientation information corresponding to the orientation detected by the orientation detection unit 55 to an image file of the image captured by the imaging unit 22, or records the image by rotating it. For the orientation detection unit 55, an acceleration sensor, a gyro sensor, or the like can be used. It is also possible to detect movement (a pan, a tilt, a lift, whether stationary or not, etc.) of the digital camera 100 using the acceleration sensor or the gyro sensor serving as the orientation detection unit 55.

The eyepiece detection unit 57 is an eyepiece detection sensor that detects approach (eye proximity) of an eye (object) 161 to the eyepiece unit 16 of the eyepiece finder 17 (hereinafter, simply referred to as a "finder") and removal (eye separation) of the eye (object). The system control unit 50 switches between display (a display state) and non-display (a non-display state) of the display unit 28 and the EVF 29 in accordance with a state detected by the eyepiece detection unit 57. More specifically, at least in a photographing standby state and in a case in which switching of a display destination is automatic switching, during non-eye proximity, the display destination is set to the display unit 28 and its display is turned on and the EVF 29 is set to non-display. In addition, during the eye proximity, the display destination is set to the EVF 29 and its display is turned on, and the display unit 28 is set to non-display. For the eyepiece detection unit 57, for example, an infrared proximity sensor can be used, and it is possible to detect approach of any object to the eyepiece unit 16 of the finder 17 incorporating the EVF 29. When an object approaches, infrared light emitted from a light emitting unit (not shown) of the eyepiece detection unit 57 is reflected by the object and received by a light receiving unit (not shown) of the infrared proximity sensor. On the basis of an amount of the received infrared light, it is also possible to determine how far the object is from the eyepiece unit 16 (an eye proximity distance). As described above, the eyepiece detection unit 57 performs eye proximity detection that detects an approaching distance of the object to the eyepiece unit 16. It is assumed that when the object having approached the eyepiece unit 16 to within a predetermined distance after a non-eye proximity state (a non-proximity state) is detected, it is detected that the eye has approached thereto. It is assumed that when the object whose approach has been detected becomes separated therefrom after the eye proximity state (proximity state) by at least a predetermined distance, it is detected that the eye has been separated therefrom. A threshold for detecting the eye proximity and a threshold for detecting the eye separation may be different from each other, for example, by providing hysteresis. Further, after detection of the eye proximity, an eye proximity state is assumed until the eye separation is detected. After detection of the eye separation, a non-eye proximity state is assumed until the eye proximity is detected. Also, the infrared proximity sensor is an example, and the eyepiece detection unit 57 may use another sensor as long as it can detect approaching of an eye or an object regarded as the eye proximity.

The system control unit 50 can detect the following operations or states of the eyepiece unit 16 by controlling the gazing determination unit 170 or the eyepiece detection unit 57.

A line of sight that has not been directed to the eyepiece unit 16 is newly directed to the eyepiece unit 16. That is, this is the start of inputting the line of sight.

A state in which the line of sight is being input to the eyepiece unit 16.

A state in which the user is gazing at the eyepiece unit 16.

The line of sight directed to the eyepiece unit 16 has been removed. That is, this is the end of inputting the line of sight.

A state in which no line of sight is input to the eyepiece unit 16.

These operations and states and the position (direction) from which the line of sight is directed to the eyepiece unit 16 are notified to the system control unit 50 via an internal bus, and the system control unit 50 determines what operation (operation of the line of sight) has been performed on the eyepiece unit 16 on the basis of the notified information.

The operation unit 70 is an input unit that receives an operation (user operation) from a user, and is used to input various operation instructions to the system control unit 50. As shown in FIG. 2, the operation unit 70 includes the mode switch 60, the shutter button 61, the power switch 72, the touch panel 70a, and the like. The operation unit 70 includes, as other operation members 70b, the main electronic dial 71, the sub electronic dial 73, the four-way key 74, the SET button 75, the video button 76, the AE lock button 77, the enlargement button 78, the reproduction button 79, the menu button 81, and the like.

The mode switch 60 switches an operation mode of the system control unit 50 to one of a still image shooting mode, a video shooting mode, a reproduction mode, and the like. Modes included in the still image shooting mode include an auto shooting mode, an auto scene determination mode, a manual mode, an aperture priority mode (Av mode), a shutter speed priority mode (Tv mode), and a program AE mode (P mode). In addition, there are various scene modes, custom modes, and the like, which are imaging settings for each imaging scene. The mode switch 60 allows the user to directly switch to any of these modes. Alternatively, after temporarily switching to a list screen of the imaging modes with the mode switch 60, the mode may be selectively switched to any of displayed modes by using another operation member. Similarly, the video shooting mode may include a plurality of modes.

The shutter button 61 includes a first shutter switch 62 and a second shutter switch 64. The first shutter switch 62 is turned on by so-called half-pressing (an imaging preparation instruction) during operation of the shutter button 61 and generates a first shutter switch signal SW1. The system control unit 50 starts an imaging preparation operation such as an autofocus (AF) process, an auto exposure (AE) process, an auto white balance (AWB) process, and a flash pre-emission (EF) process in response to the first shutter switch signal SW1. The second shutter switch 64 is turned on when the operation of the shutter button 61 is completed, that is, when the shutter button 61 is fully pressed (an imaging instruction) and generates a second shutter switch signal SW2. In response to the second shutter switch signal SW2, the system control unit 50 starts a series of imaging processing operations from reading out the signal from the imaging unit 22 to writing the captured image as an image file on the recording medium 200.

The touch panel 70a and the display unit 28 can be integrally formed. For example, the touch panel 70a is configured such that light transmittance does not hinder display on the display unit 28 and is attached to an upper layer of a display surface of the display unit 28. In addition, input coordinates on the touch panel 70a are associated with display coordinates on the display surface of the display unit 28. Thus, it is possible to provide a graphical user interface (GUI) as if the user could directly operate a screen displayed on the display unit 28. The system control unit 50 can detect the following operations or states on the touch panel 70a.

A finger or pen that has not touched the touch panel 70a newly touches the touch panel 70a. That is, this is the start of a touch (hereinafter, referred to as a touch-down).

A state in which the touch panel 70a is being touched with a finger or a pen (hereinafter, referred to as a touch-on).

A finger or a pen is moving while touching the touch panel 70a (hereinafter, referred to as a touch-move).

A finger or pen touching the touch panel 70a has separated (been released) from the touch panel 70a. That is, the end of the touch (hereinafter, referred to as a touch-up).

A state in which nothing is touching on the touch panel 70a (hereinafter, referred to as a touch-off).

When the touch-down is detected, the touch-on is also detected at the same time. After the touch-down, the touch-on is normally continuously detected unless the touch-up is detected. When the touch move is detected, the touch-on is detected at the same time. Even when the touch-on is detected, the touch move is not detected unless a touch position is moved. After all the touched fingers or pens are detected to have been touched up, it becomes the touch-off These operations and states and the position coordinates in which the finger or the pen is touching the touch panel 70a are notified to the system control unit 50 via the internal bus. Then, the system control unit 50 determines what operation (touch operation) has been performed on the touch panel 70a on the basis of the notified information. As for the touch-move, a moving direction of the finger or the pen moving on the touch panel 70a can also be determined for each of a vertical component and a horizontal component on the touch panel 70a on the basis of changes in the position coordinates. When it is detected that the touch-move has been performed for at least a predetermined distance, it is determined that a sliding operation has been performed. An operation of quickly moving a finger on the touch panel 70a by a certain distance while touching the finger and releasing the finger is referred to as a flick. In other words, the flick is an operation of quickly tracing the touch panel 70a as if to flick it with a finger. When it is detected that a touch-move has been performed for at least a predetermined distance at at least a predetermined speed, and in this state, the touch-up is detected, it can be determined that the flick has been performed (it can be determined that there has been the flick following the sliding operation). Further, a touch operation of touching (multi-touching) a plurality of positions (for example, two points) together to bring the touch positions closer to each other is referred to as a pinch-in, and a touch operation for moving the touch positions away from each other is referred to as a pinch-out. The pinch-out and pinch-in are collectively referred to as a pinch operation (or simply a pinch). The touch panel 70a may be any of various types of touch panels such as a resistive film type, a capacitive type, a surface acoustic wave type, an infrared type, an electromagnetic induction type, an image recognition type, and an optical sensor type. There are a method of detecting that a touch has been made when there is a touch on the touch panel, and a method of detecting that a touch has been made when there is a finger or a pen approaching the touch panel, and any method may be used.

Also, the digital camera 100 may be provided with a voice input unit (not shown) that transmits a voice signal obtained from an embedded microphone or a voice input device connected thereto via a voice input terminal to the system control unit 50. In this case, the system control unit 50 selects the input voice signal as needed, and performs analog-to-digital conversion, level optimization processing, reduction processing of a specific frequency, and the like to generate a voice signal.

<Control of Focus Adjustment Position>

Control of a focus adjustment position (a selected position) according to the present embodiment will be described with reference to FIGS. 3A and 3B. In the present embodiment, the focus adjustment position is a position used for focus adjustment performed by the digital camera 100, and is, for example, a ranging position. The focus adjustment position is adjusted (updated) through the control which will be described later.

Figure 3A:
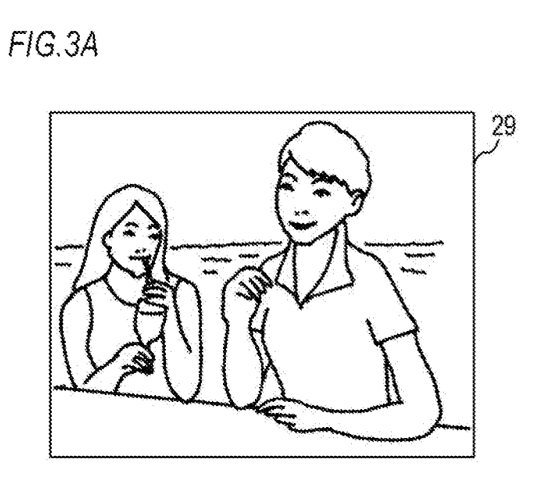
FIG. 3A is a diagram showing a viewed point according to the present embodiment.

FIG. 3A shows an example of an image displayed on the EVF 29 when the eyepiece unit 16 of the digital camera 100 is brought into contact with an eye. FIG. 3B shows an image displayed on the EVF 29, a user's eyeball (eye) 161, a position 301 indicating the focus adjustment position (a focus adjustment portion), positions 302 to 305 indicating the user's viewed points (input positions), circles 310a to 310d indicating distances from the focus adjustment position, and the like. A viewed point is a position detected by the line of sight detection unit 160. In the example shown in FIG. 3B, the focus adjustment position is assumed to be at a position (the position 301) of a left eye of a person located on the right in the image. Also, the positions 302 to 304 are assumed to be at positions of a right eye, a nose, and a left cheek of the person located on the right in the image. The position 305 is assumed to be at a position of a right eye of a person located on the left in the image. The circles 310a to 310d are all concentric circles centering on the focus adjustment position (position 301), and in the present embodiment, radii of the circles 310a to 310d are La to Ld, respectively.

Figure 3B:
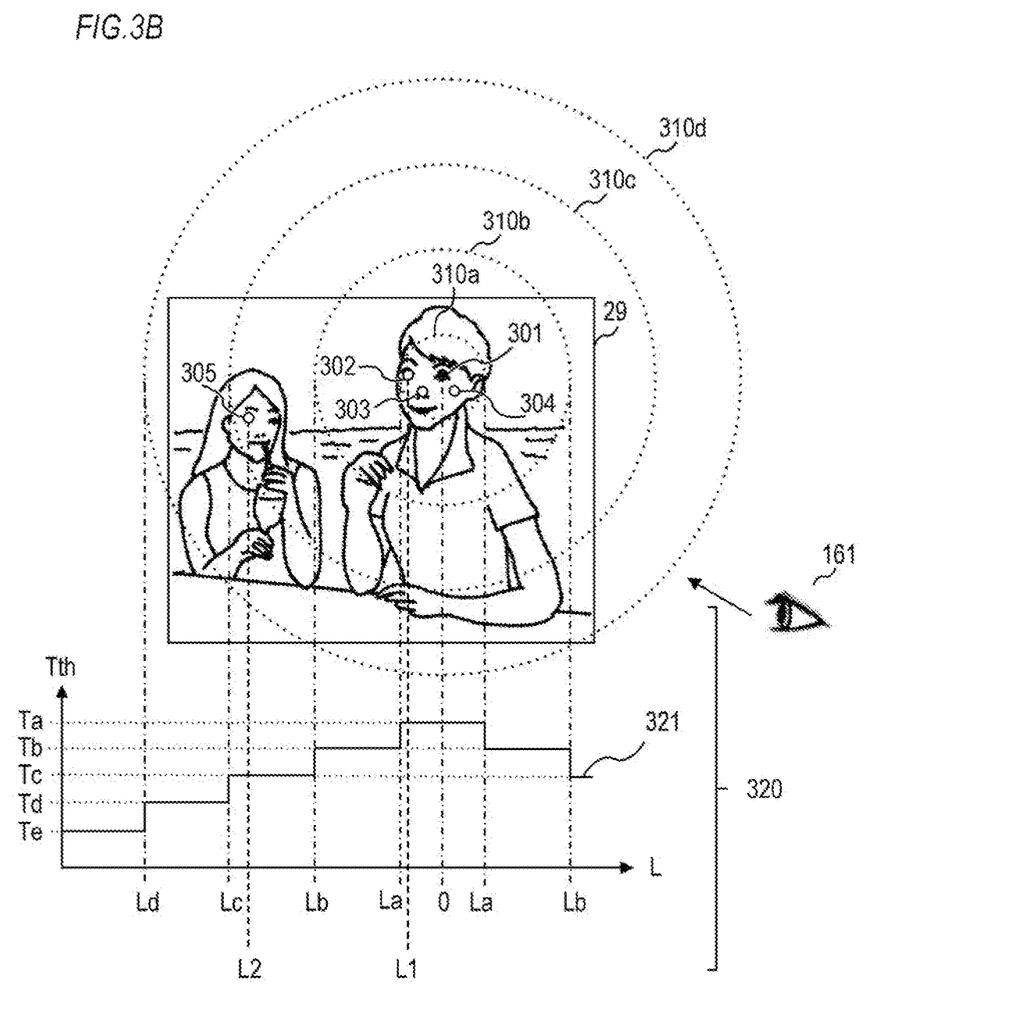
FIG. 3B is a diagram showing a focus adjustment position according to the present embodiment.

Further, FIG. 3B shows a graph 320 showing a relationship between a distance L from the focus adjustment position in the image and a gazing time threshold Tth. As described above, the gazing determination unit 170 determines that the user is gazing at a certain region in a case where a time during which the user's line of sight is fixed on the region exceeds the gazing time threshold Tth. In addition, the system control unit 50 updates the focus adjustment position in a case where the user is gazing at a predetermined region (position) in the image for at least the gazing time threshold Tth.

In the present embodiment, the threshold Tth is determined in accordance with the distance from the focus adjustment position (the graph 320). Specifically, as indicated by a line 321 of the graph 320, the threshold Tth for determining whether or not the user is gazing at something is set to be smaller as the distance L from the focus adjustment position (position 301) to the user's viewed point increases (becomes farther).

In the example of FIG. 3B, since a distance L1 from the focus adjustment position (position 301) to the position 302 is not more than La (the radius of the circle 310a) in a case where the user's viewed point is located at the position 302, Ta is set as the threshold Tth. Similarly, since a distance from the focus adjustment position is not more than La in a case where the user's viewed point is at the position 303 or the position 304, Ta is set as the threshold Tth. That is, even if the user's viewed point moves to a peripheral portion of the focus adjustment position such as the positions 302 to 304 when the position 301 is selected as the focus adjustment position, a change (a switch) of the focus adjustment position in accordance with the movement of the viewed point is not performed in a case where a time during which the line of sight stays is not more than Ta.

In the example of FIG. 3B, since a distance L2 from the focus adjustment position (position 301) to the position 305 is greater than Lb and not more than Lc in a case where the user's viewed point is at the position 305, Tc (<Ta) is set as the threshold Tth. Therefore, in a case where the user's viewed point moves to the position 305 when the position 301 is selected as the focus adjustment position, a change of the focus adjustment position is performed if a time during which the line of sight stays is greater than Tc, even if it does not reach Ta.

In this way, the threshold Tth is set to be relatively larger when the viewed point is closer to the focus adjustment position than when it is farther therefrom. Thus, even in a case where the viewed point has changed in the vicinity of the focus adjustment position (due to involuntary eye movement, etc.), movement of the focus adjustment position against the user's intention is prevented. In addition, the threshold Tth is set to be relatively smaller when the viewed point is farther from the focus adjustment position than when it is closer thereto. Thus, in a case where the viewed point significantly changes (for example, in a case where another object is viewed), the focus adjustment position is moved in accordance with the user's viewed point.

<Content of Processes>

Figure 4:
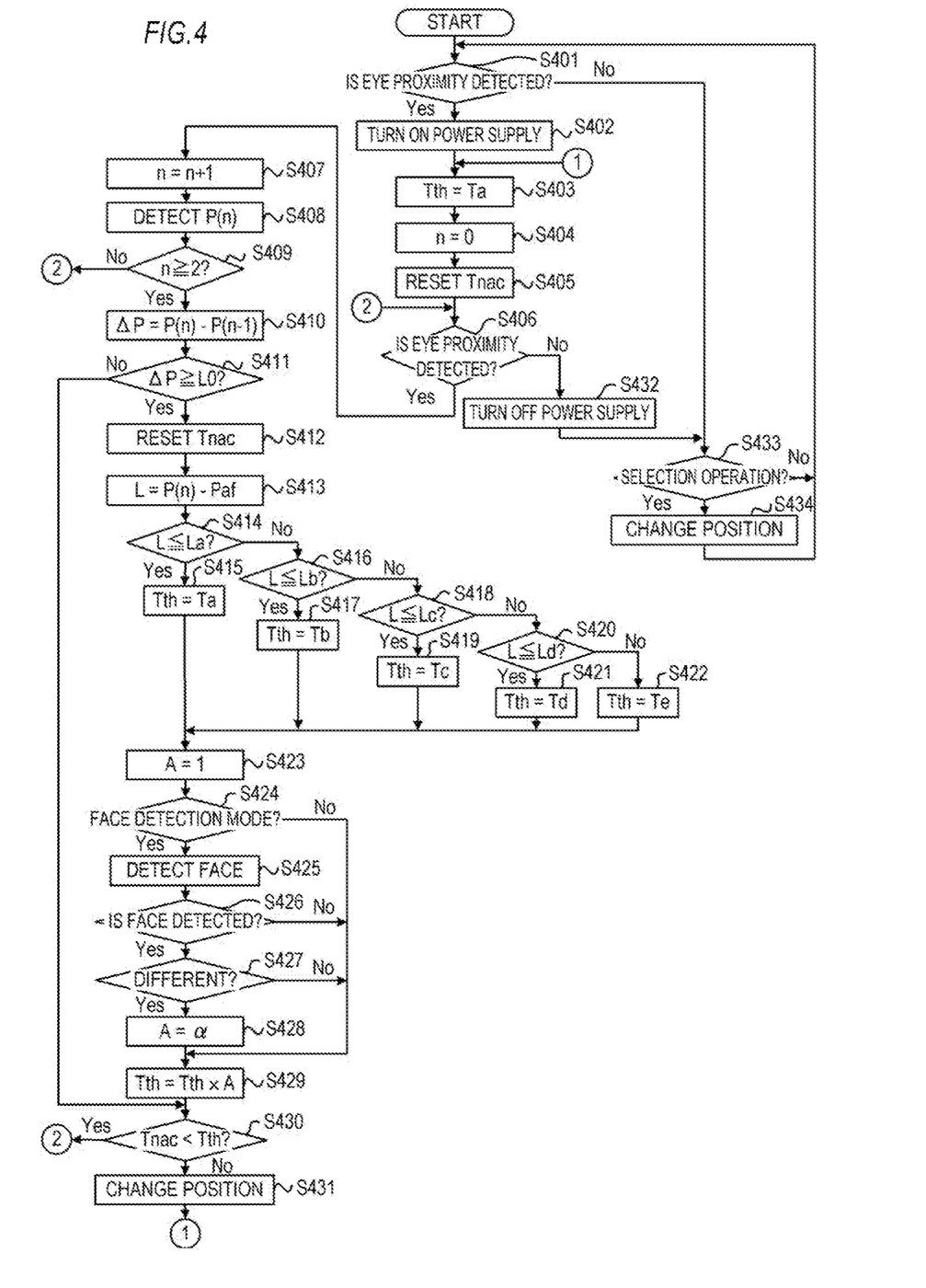
FIG. 4 is a flowchart showing a process of the focus adjustment position according to the present embodiment.

FIG. 4 is a flowchart showing control of the focus adjustment position according to the present embodiment. Each process in this flowchart is realized by the system control unit 50 that develops a program stored in the non-volatile memory 56 into the system memory 52 and executes the program to control each functional block.

In S401, the system control unit 50 determines whether or not proximity with an eye has been detected. In the present embodiment, the above determination is performed on the basis of whether or not the eyepiece detection unit 57 has detected the eye proximity of the user on the eyepiece unit 16 with the focus adjustment position of the digital camera 100 set to be controllable on the basis of the viewed point. If the eye proximity has been detected, the process proceeds to S402, and if not, the process proceeds to S433.

In S402, the system control unit 50 turns on a power supply for the line of sight detection unit 160 (an electrical circuit, a light-emitting element, etc.). When the power supply is turned on, a line of sight detection operation (a line of sight receiving operation) is continuously performed at predetermined time intervals until the power supply for the line of sight detection unit is turned off (S432). In S403, the system control unit 50 sets the threshold Tth used for determining the gazing time. In the present embodiment, Ta is set as an initial value of the threshold Tth. Also, Ta is the largest of the values that can be set as the threshold Tth in the present embodiment. In S404, the system control unit 50 initializes a numerical value n indicating the number of times viewed point detection is performed. In S405, the system control unit 50 resets (initializes) a gazing timer Tnac. The gazing timer is a timer for measuring the gazing time of the user.

In S406, the system control unit 50 determines again whether or not the eye proximity has been detected. If the eye proximity has been detected, the process proceeds to S407, and if not, the process proceeds to S432. In S407, the system control unit 50 counts up the numerical value n indicating the number of times viewed point detection is performed. In S408, the system control unit 50 detects a current user's viewed point P(n). In a case where the power supply has just been turned on (n=1), the user's viewed point is detected as P(1).

In S409, the system control unit 50 determines whether or not the numerical value n indicating the number of detections is at least 2. If the numerical value n is at least 2, the process proceeds to S410, and if not, the process proceeds to S406. In S410, the system control unit 50 obtains a distance ΔP (a movement amount) between the current viewed point P(n) and the previous viewed point P(n−1).

In S411, the system control unit 50 determines whether or not the distance ΔP is at least a predetermined value L0. If the distance ΔP is at least the predetermined value L0, the process proceeds to S412, and if not, the process proceeds to S430. Here, the case where the distance ΔP is at least the predetermined value L0 is a case where it is determined that the user has intentionally changed the viewed point, and for example, a case where the user is looking at a region different from that at the previous time (for example, a different person's face from that at the time of the previous viewed point detection in group photographing). A case where the distance ΔP is less than the predetermined value L0 (less than a predetermined threshold) is a case where it cannot be said that the user has intentionally changed the viewed point although the viewed point has slightly changed (for example, involuntary eye movement, or the like).

In S412, since the viewed point has been intentionally changed, the system control unit 50 resets (initializes) the gazing timer Tnac. In S413, the system control unit 50 obtains the distance L between the focus adjustment position Paf that is being selected and the viewed point P(n). Here, assuming that a two-dimensional coordinate value of the focus adjustment position Paf on the display screen of the EVF 29 is (Xaf, Yaf) and a two-dimensional coordinate value of the current viewed point P(n) on the display screen of the EVF 29 is (Xpn, Ypn), the distance L can be calculated using the following Equation (1).

$$L=\sqrt{(Xpn-Xaf)^2+(Ypn-Yaf)^2} \quad (1)$$

In S414 to S422, the system control unit 50 determines the threshold Tth used for the determination of the gazing time in accordance with the distance L obtained above. In the present embodiment, the system control unit 50 sets the threshold Tth to be any one of Ta to Te on the basis of the distances L and La to Ld shown in FIG. 3B (Equation (2)). For example, values such as Ta=1.0 second, Tb=0.8 seconds, Tc=0.5 seconds, Td=0.3 seconds, and Te=0.1 seconds can be set.

$$Tth = \begin{cases} Ta & (L \le La) \\ Tb & (La < L \le Lb) \\ Tc & (Lb < L \le Lc) \\ Td & (Lc < L \le Ld) \\ Te & (Ld < L) \end{cases} \quad (2)$$

Specifically, in S414, the system control unit 50 determines whether or not the distance L is not more than La. If the distance L is not more than La, the process proceeds to S415, and if not, the process proceeds to S416. In S415, the system control unit 50 sets the threshold Tth to be Ta.

In S416, the system control unit 50 determines whether or not the distance L is not more than Lb. If the distance L is not more than Lb, the process proceeds to S417, and if not, the process proceeds to S418. In S417, the system control unit 50 sets the threshold Tth to be Tb.

In S418, the system control unit 50 determines whether or not the distance L is not more than Lc. If the distance L is not more than Lc, the process proceeds to S419, and if not, the process proceeds to S420. In S419, the system control unit 50 sets the threshold Tth to be Tc.

In S420, the system control unit 50 determines whether or not the distance L is not more than Ld. If the distance L is not more than Ld, the process proceeds to S421, and if not, the process proceeds to S422. In S421, the system control unit 50 sets the threshold Tth to be Td. In S422, the system control unit 50 sets the threshold Tth to be Te.

In S423 to S429, the system control unit 50 performs a face detection and adjusts the threshold Tth in accordance with the detection results. Also, the system control unit 50 may perform the process of S430 after performing any of the processes of S415, S417, S419, S421, and S422 without performing the processes of S423 to S429. Thus, the threshold Tth can be controlled regardless of a status of the face detection.

In S423, the system control unit 50 initializes a value of a coefficient A, which is a coefficient by which the threshold Tth is multiplied (A=1). In S424, the system control unit 50 determines whether or not the digital camera 100 is in a face detection mode. If it is in the face detection mode, the process proceeds to S425, and if not, the process proceeds to S429.

In S425, the system control unit 50 performs the face detection using an image displayed on the EVF 29. In the face detection, the system control unit 50 detects a region indicating a face of an object or a region indicating a portion of the face (an eye, a nose, etc.) using various existing methods. In S426, the system control unit 50 determines whether or not the face detection has been completed (whether or not the face has been detected). If the face detection has been completed, the process proceeds to S427, and if not, the process proceeds to S429.

In S427, the system control unit 50 determines whether or not the detected results are different from those at the previous time. As the case where the detected results are different from those at the previous time, for example, a case where the viewed point P(n) is located on a face different from the previous face (for example, the face of a different person) can be exemplified. Also, as the case where the detected results are different from those at the previous time, for example, a case where the viewed point P(n) is located on a portion (an eye, a nose, a cheek, a mouth, etc.) different from that at the previous time on the same face as that at the previous time can be exemplified. Further, in the process of S427, it is determined whether or not the current viewed point P(n) is on the face regardless of the previous viewed point, and if it is on the face, the process may proceed to S428, and if not, the process may proceed to S429.

In S428, the system control unit 50 sets the coefficient A to be a predetermined value α. The predetermined value a is a value less than 1, and can be set to α=0.7, for example. In S429, the system control unit 50 multiplies the threshold Tth by the coefficient A. As a result, in a case where the condition of S427 is satisfied, the determination of the gazing time is performed with a threshold (0.7 times when α=0.7) smaller than the threshold Tth set in S414 to S422.

In S430, the system control unit 50 determines whether or not a value of the gazing timer Tnac is smaller than the threshold Tth. If the value of the gazing timer Tnac is smaller than the threshold Tth, the process proceeds to S406, and if not, the process proceeds to S431. Also, it is not assumed that the process proceeds from S430 to S431 immediately after S429, and the process proceeds to S431 after the processes of S406 to S411 and S430 are repeated.

In S431, the system control unit 50 changes the focus adjustment position. In the present embodiment, the system control unit 50 changes the focus adjustment position to the current viewed point P(n). Also, a site to which the focus adjustment position is changed is not limited to the viewed point P(n) and may be any position corresponding to the viewed point P(n). For example, the site to which the focus adjustment position is changed may be a position of a center of gravity of the viewed points P(1) to P(n) until the gazing timer Tnac reaches the threshold Tth.

In S432, the system control unit 50 turns off the power supply for the line of sight detection unit 160. In S433, the system control unit 50 determines whether or not a selection operation of the focus adjustment position has been performed in accordance with an input operation other than the line of sight input (the four-way key 74 or the like). If the selection operation has been performed, the process proceeds to S434, and if not, the process proceeds to S401. In S434, the system control unit 50 changes the focus adjustment position in accordance with the selection operation described above.

<Advantageous Effects of Present Embodiment>

As described above, in the present embodiment, when the viewed point is closer to the focus adjustment position, the time used for the gazing determination is relatively lengthened, and when the viewed point is farther from the focus adjustment position, the time used for the gazing determination is relatively shortened. Thus, in a case where the viewed point has slightly changed in the vicinity of the focus adjustment position, it is possible to prevent the focus adjustment position from being changed against the user's intention. On the other hand, since sensitivity is higher as the viewed point is farther from the focus adjustment position, the focus adjustment position is quickly changed on the basis of the detected viewed point so that the user can select the focus adjustment position using the line of sight without feeling discomfort, which enables smooth photographing.

Further, in the embodiment described above, in addition to the selection of the focus adjustment position in accordance with the line of sight input, the selection of the focus adjustment position in accordance with an operation on the operation unit of the digital camera can also be used. As a result, it is possible to cope with a case where the line of sight input does not result in the user's intended operation due to a factor resulting from an environmental condition or an individual eye (for example, a case where the focus adjustment position is switched to an adjacent portion), to roughly switch the focus adjustment position with the line of sight input and perform a fine adjustment by operating an operation member, and the like.

Further, in the embodiment described above, in the case where the face detection is performed, the threshold Tth is set to be smaller in accordance with the detection results. Thus, it is possible to improve a response in a case where the focus adjustment position is changed to a different portion from a current portion (for example, a right eye to a left eye) within the same object, or the focus adjustment position is changed to a face of another object in a group photo.

Modified Examples

Although an example in which the process of determining the threshold Tth is performed on the basis of the distance between the focus adjustment position and the viewed point in S413 to S422 has been described in the embodiment described above, the process may not be performed. For example, in a case where the threshold Tth has been initialized to a predetermined value and gazing at a position at which a specific object (for example, a face) is detected is being performed, the system control unit reduces the threshold Tth as compared with a case where gazing at a position at which the specific object is not detected is being performed. Alternatively, in a case where the threshold Tth has been initialized to a predetermined value and the viewed point moves between different faces displayed on a display unit, the system control unit reduces the threshold Tth as compared with a case where the viewed point moves within the same face displayed on the display unit. Alternatively, in a case where the threshold Tth has been initialized to a predetermined value and the viewed point moves between different portions of a face displayed on the display unit, the system control unit reduces the threshold Tth as compared with a case where the viewed point moves within the same portion of the face. Also, these may be combined. For example, the system control unit may set the threshold Tth to be T1 which is smaller than a predetermined value in a case where gazing at the position at which a specific object is detected is being performed, and may set the threshold Tth to be T2 smaller than T1 in a case where the viewed point moves between different faces.

Also, the system control unit may change the threshold Tth on the basis of an angle of view of an image. The angle of view of the image is information indicating a range displayed on the EVF 29. For example, the angle of view is determined by referring to metadata of image data corresponding to the image or determined in accordance with an enlargement rate of the image. Specifically, in a case where the angle of view is wider (a display range is wider), the system control unit may reduce the threshold Tth as compared with a case where the angle of view is narrower.

Also, although an example in which each of Ta=1.0 second, Tb=0.8 seconds, Tc=0.5 seconds, Td=0.3 seconds, and Te=0.1 seconds is set as the threshold Tth has been described, the value of the threshold Tth is not limited to these values.

Also, although an example in which the distance L is calculated on the basis of the two-dimensional coordinate value (X, Y) on the display of the EVF 29 using the Pythagorean theorem has been described, a method of calculating the distance is not particularly limited. For example, in a case where a change amount of one of the X coordinate and the Y coordinate (a movement amount in a direction along one of the X axis and the Y axis) is within a predetermined value, a simplified method such as obtaining the distance L by using only a change amount of the other of the X coordinate and the Y coordinate may be used.

Also, although an example in which the above selection operation is received in a case where the eye proximity detection is not performed has been described in the present embodiment, the above selection operation may be received in a case where the eye proximity detection is being performed.

According to the present invention, changing of a selection target which is not intended by the user due to the line of sight and deterioration of an operational feeling can be reduced.

The present invention can be applied to an input operation of various electronic devices including an information input function using the line of sight detection function and is not limited to the configuration of the embodiment described above. As long as functions presented in the claims or functions of the configuration of the present embodiment can be achieved, the present invention can be applied regardless of configurations.

The present invention is not limited to a digital camera, and is applicable to a case where the line of sight can be input to, for example, a display screen of a personal computer (PC), a television, a head mounted display (HMD), or the like. Also, although an example in which the ranging position (AF position) is used as the selection target using the line of sight input has been described in the embodiment described above, the present invention is not limited thereto. The present invention is also applicable to a case of selecting a plurality of options with the line of sight input, such as ISO sensitivity, shutter speed, aperture setting value (F value), exposure compensation, photographing mode (options are a manual mode, a program mode, an aperture priority mode, a shutter speed priority mode, an auto mode, and the like). Also, the present invention is applicable to a display screen for the user to select from a plurality of options, without being limited to the photographing settings or any other setting items. For example, the present invention can be applied to a screen for selecting a filter effect (image quality adjustment) applied to an image, a screen for selecting any of a plurality of files and folders including documents, images, music, and the like as options, a screen for selecting any of a plurality of contact addresses and communication destinations as options, etc. Also, similarly to a mouse pointer, the present invention is applicable to a screen on which a position is specified (selected) using the line of sight input. In addition to the use in the camera according to the embodiment, use in a head mounted display (HMD) or virtual reality (VR) is also possible.

Also, the various controls described as being performed by the system control unit 50 may be performed by one piece of hardware, or a plurality of pieces of hardware (for example, a plurality of processors or circuits) may share the processes, thereby performing the control of the entire device.

Also, although the present invention has been described in detail on the basis of preferred embodiments, the present invention is not limited to these specific embodiments, and various aspects within the scope not departing from the gist of the present invention are also included in the present invention. Further, each of the embodiments described above is merely an example of the present invention, and each of the embodiments can be appropriately combined with others.

In addition, although the case where the present invention is applied to a digital camera has been described as an example in the embodiment described above, the present invention is not limited to this example and is applicable to any electronic device that can receive the line of sight input. That is, the present invention is applicable to a personal computer, a PDA, a mobile phone terminal, a portable image viewer, a printer device including a display, a digital photo frame, a music player, a game machine, an electronic book reader, and the like.

Further, the present invention is not limited to a main body of an imaging device and is applicable to a control device that communicates with the imaging device (including network cameras) via wired or wireless communication and remotely controls the imaging device. Examples of the device that remotely controls the imaging device include devices such as smartphones, tablet PCs, and desktop PCs. The control device notifies the imaging device of commands for performing various operations and settings on the basis of operations performed on the control device side and processing performed on the control device side, whereby the imaging device can be controlled remotely. Also, a live view image captured by the imaging device may be received via wired or wireless communication and be displayed on the control device side.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140035, filed on Jul. 30, 2019, which is hereby incorporated by reference herein in its entirety.

What is claimed is:

1. An electronic device comprising:
   at least one memory and at least one processor which function as:
   a receiving unit configured to receive a line of sight input by a line of sight of a user looking at a display; and
   a control unit configured to perform control such that a selected position in the display is changed in accordance with an input position resulting from the line of sight input, wherein
   the control unit performs control
   A) such that the selected position is changed based on gazing at a first position in response to satisfaction of a viewed point condition corresponding to a fact that gazing at the first position at a first distance from the selected position has been performed for a first period, and
   B) such that the selected position is changed based on gazing at a second position in response to satisfaction of a viewed point condition corresponding to a fact that gazing at the second position at a second distance which is farther from the selected position than the first distance has been performed for a second period shorter than the first period.

2. The electronic device according to claim 1, wherein the at least one memory and the at least one processor further function as a detection unit configured to detect a specific object from an image displayed on the display, wherein
   in a case where gazing at a position at which the specific object is detected by the detection unit is being performed, the control unit shortens a period of the gazing in the conditions for changing the selected position as compared with a case where gazing at a position at which the specific object is not detected by the detection unit is being performed.

3. The electronic device according to claim 2, wherein the specific object is a face.

4. The electronic device according to claim 1, wherein, in a case where a position of the gazing moves between different portions of a face displayed on the display, the control unit shortens a period of the gazing in the conditions for changing the selected position as compared with a case where the position of the gazing moves within a single portion of the face.

5. The electronic device according to claim 1, wherein, in a case where a position of the gazing moves between different faces displayed on the display, the control unit shortens a period of the gazing in the conditions for changing the selected position as compared with a case where the position of the gazing moves within a single face displayed on the display.

6. The electronic device according to claim 1, wherein the control unit is further configured to change a period of the gazing in the conditions for changing the selected position based on an angle of view of an image displayed on the display.

7. The electronic device according to claim 1, wherein the control unit is further configured to shorten a period of the gazing in the conditions for changing the selected position as a distance between the selected position and the position of the gazing increases.

8. The electronic device according to claim 1, further comprising an operation member configured to receive an operation by the user, wherein
   the control unit is further configured to change the selected position in accordance with an operation on the operation member.

9. The electronic device according to claim 1, wherein the viewed point conditions corresponding to the fact that the gazing has been performed include a condition of a movement amount of the input position being less than a predetermined threshold.

10. A non-transitory computer readable medium that stores a program for causing a computer to function as the units of the electronic device according to claim 1.

11. A method of controlling an electronic device, the method comprising:
    a receiving step of receiving a line of sight input by a line of sight of a user looking at a display; and
    a controlling step of performing control such that a selected position in the display is changed in accordance with an input position resulting from the line of sight input, wherein
    the control is performed A) such that the selected position is changed based on gazing at a first position in response to satisfaction of a viewed point condition corresponding to a fact that gazing at the first position at a first distance from the selected position has been performed for a first period, and
    B) such that the selected position is changed based on gazing at a second position in response to satisfaction of a viewed point condition corresponding to a fact that gazing at the second position at a second distance which is farther from the selected position than the first distance has been performed for a second period shorter than the first period.

12. An electronic device comprising:
    at least one memory and at least one processor which function as:
    a receiving unit configured to receive a line of sight input by a line of sight of a user looking at a display on which an image is displayed;
    a detection unit configured to detect a specific object from the image; and
    a control unit configured to perform control such that a selected position in the display is changed in accordance with an input position resulting from the line of sight input, wherein
    the control unit performs control
    A) such that the selected position is changed based on gazing at a third position in response to satisfaction of a viewed point condition corresponding to a fact that gazing at the third position at which the specific object is not detected by the detection unit has been performed for a third period, and
    B) such that the selected position is changed based on gazing at a fourth position in response to satisfaction of a viewed point condition corresponding to a fact that gazing at the fourth position at which the specific object is detected by the detection unit has been performed for a fourth period shorter than the third period.

13. The electronic device according to claim 12, wherein the specific object is a face.

14. The electronic device according to claim 12, wherein, in a case where a position of the gazing moves between different portions of a face displayed on the display, the control unit shortens a period of the gazing in the conditions for changing the selected position as compared with a case where the position of the gazing moves within a single portion of the face.

15. The electronic device according to claim 12, wherein, in a case where a position of the gazing moves between different faces displayed on the display, the control unit shortens a period of the gazing in the conditions for changing the selected position as compared with a case where the position of the gazing moves within a single face displayed on the display.

16. The electronic device according to claim 12, wherein the control unit is further configured to change a period of the gazing in the conditions for changing the selected position based on an angle of view of an image displayed on the display.

17. The electronic device according to claim 12, wherein the control unit is further configured to shorten a period of the gazing in the conditions for changing the selected position as a distance between the selected position and the position of the gazing increases.

18. A non-transitory computer readable medium that stores a program for causing a computer to function as the units of the electronic device according to claim 12.

19. A method of controlling an electronic device, the method comprising:
- a receiving step of receiving a line of sight input by a line of sight of a user looking at a display on which an image is displayed;
- a detecting step of detecting a specific object from the image; and
- a controlling step of performing control such that a selected position in the display is changed in accordance with an input position resulting from the line of sight input, wherein the control is performed A) such that the selected position is changed based on gazing at a third position in response to satisfaction of a viewed point condition corresponding to a fact that gazing at the third position at which the specific object is not detected in the detecting step has been performed for a third period, and B) such that the selected position is changed based on gazing at a fourth position in response to satisfaction of a viewed point condition corresponding to a fact that gazing at the fourth position at which the specific object is detected in the detecting step has been performed for a fourth period shorter than the third period.

* * * * *